United States Patent [19]
Boulos et al.

[11] Patent Number: 5,851,940
[45] Date of Patent: Dec. 22, 1998

[54] BLUE GLASS WITH IMPROVED UV AND IR ABSORPTION

[75] Inventors: Edward Nashed Boulos, Troy, Mich.; James Victor Jones, Toledo, Ohio

[73] Assignee: Ford Motor Company, Dearborn, Mich.

[21] Appl. No.: 891,684

[22] Filed: Jul. 11, 1997

[51] Int. Cl.⁶ .............................. C03C 3/087; C03C 4/08
[52] U.S. Cl. .............................................. 501/71; 501/905
[58] Field of Search ................................. 501/70, 71, 905

[56] References Cited

U.S. PATENT DOCUMENTS

| | | |
|---|---|---|
| Re. 34,639 | 6/1994 | Boulos et al. . |
| Re. 34,760 | 10/1994 | Boulos et al. . |
| 2,360,280 | 10/1944 | Rolph et al. . |
| 2,923,636 | 2/1960 | Swain . |
| 2,938,808 | 5/1960 | Duncan et al. . |
| 3,024,120 | 3/1962 | Babcock . |
| 3,024,121 | 3/1962 | Hagedorn . |
| 3,046,400 | 7/1962 | Paymal . |
| 3,300,323 | 1/1967 | Plumat et al. . |
| 3,351,475 | 11/1967 | Hagedorn et al. . |
| 3,561,985 | 2/1971 | Hagedorn et al. . |
| 3,779,733 | 12/1973 | Janakirama-Rao . |
| 4,792,536 | 12/1988 | Pecoraro et al. ........................ 501/70 |
| 4,866,010 | 9/1989 | Boulos et al. ............................ 501/71 |
| 4,873,206 | 10/1989 | Jones . |
| 5,013,487 | 5/1991 | Cheng . |
| 5,069,826 | 12/1991 | Cheng . |
| 5,214,008 | 5/1993 | Beckwith et al. . |
| 5,240,886 | 8/1993 | Gulotta et al. . |
| 5,344,798 | 9/1994 | Morimoto et al. . |
| 5,346,867 | 9/1994 | Jones et al. . |
| 5,352,640 | 10/1994 | Combes et al. . |
| 5,393,593 | 2/1995 | Gulotta et al. . |
| 5,411,922 | 5/1995 | Jones . |
| 5,521,128 | 5/1996 | Jones et al. . |
| 5,558,942 | 9/1996 | Itoh et al. . |
| 5,593,929 | 1/1997 | Krumwiede et al. . |
| 5,656,560 | 8/1997 | Stotzel et al. . |
| 5,674,791 | 10/1997 | Amundson, Jr. ......................... 501/71 |
| 5,780,372 | 7/1998 | Higby ..................................... 501/71 |

FOREIGN PATENT DOCUMENTS

| | | |
|---|---|---|
| 4-310539 | 11/1992 | Japan . |
| 6-56466 | 3/1994 | Japan . |

*Primary Examiner*—Karl Group
*Attorney, Agent, or Firm*—Lorraine S. Melotik

[57] ABSTRACT

The invention is a soda-lime-silica glass composition which is blue in color and having improved UV and IR absorption. The spectral properties of the blue glass at a 4.0 mm. Thickness include: 477–494 dominant wavelength and 6–40% purity of excitation. The blue glass composition, by weight, comprises a base glass composition of: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: 0.4 to 2.0% total iron oxide as $Fe_2O_3$, 0.15 to 2.00% manganese oxide as $MnO_2$; 0.005 to 0.025% cobalt oxide as Co, and 0 to 1.00% titanium oxide as $TiO_2$. The glass is useful for automotive or architectural applications. It preferably is made by a nitrite-free method which may desirably involve the use of a reducing agent during melting operations.

15 Claims, No Drawings

BLUE GLASS WITH IMPROVED UV AND IR ABSORPTION

Reference is made to related U.S. Pat. No. 5,807,417 entitled "A NITRATE-FREE METHOD FOR MANUFACTURING A BLUE GLASS" concurrently filed and commonly assigned herewith.

The invention is directed to a blue glass composition having improved ultra-violet (UV) and infra-red (IR) absorption together with a low shading coefficient. More particularly, it is a soda-lime-silica glass whose colorants are iron oxide, cobalt oxide, manganese oxide and optionally titanium oxide. Preferably the blue glass is manufactured by a nitrate-free method which may use, e.g., anthracite coal as a reducing agent.

BACKGROUND OF THE INVENTION

Blue glass has found particular utility for architectural applications as building glass and has been considered for automotive glass applications. Blue glass has been manufactured using iron oxide, cobalt, and selenium as colorants, the cobalt imparting a blue color to the glass, as disclosed in U.S. Pat. No. RE 34,639 to Boulos et al. In U.S. Pat. No. RE 34,760, Boulos et al disclose blue glass using iron oxide, cobalt, and nickel, and yet in another embodiment, a blue glass further including selenium, both patents being commonly owned with the present invention. Selenium is however a costly colorant and tends to volatilize from the glass while nickel is prone to undesirable nickel sulfide "stone" formation within the glass. Still another blue glass composition is disclosed in U.S. Pat. No. 5,344,798, the glass including iron oxide and cerium oxide, together optionally with limited amounts of titanium oxide, zinc oxide, manganese oxide, and cobalt oxide, and having a specific $Fe^{+2}/Fe^{+3}$ wt. ratio. The use of cerium oxide, which is known to improve UV absorption, is less than commercially desirable because cerium oxide is extremely expensive.

Iron oxide exists in two forms in glass, the reduced (Fe+2) form and the oxidized (Fe+3) form. Another blue glass composition, disclosed in U.S. Pat. No. 3,779,733, incorporates tin oxides to form more of the blue reduced (Fe+2) iron which has IR absorbing properties. This decreases the amount of the yellow oxidized iron, however, which has UV absorbing properties. Others have used a combination of zinc and tin oxides to similarly reduce the iron and form a pale blue glass, as in U.S. Pat. No. 5,013,487, with a resultant lowering of the UV absorption. Another pale blue glass is obtained in U.S. Pat. No. 4,792,536 using a unique melting furnace to reduce the iron oxide, without using tin or zinc oxides, which again lowers the UV absorption.

As would be appreciated, the UV and IR light absorption properties of iron oxide are especially valuable when the glass is to be used in buildings. When heat is absorbed by the glass, the load on building air conditioners is reduced and when the ultra violet absorption is improved, there is less damage over time to the colors of articles inside the building, additionally providing for more comfort. Therefore, controlling these spectral properties of the glass is very important. Adding iron oxide to the glass under normal furnace conditions improves both the ultra-violet and the infrared absorption of the glass since the concentration of both iron forms is correspondingly increased, but this improvement is at the expense of visible transmittance since the reduced form is darker in color. That is, as iron oxide is added, the color of the glass darkens so that the visible transmittance is correspondingly decreased which may limit the usefulness of the glass.

We have unexpectedly found that the present invention blue glass can include relatively large amounts of iron oxide yet have good visible transmittance and excellent UV absorbing properties, without the undesirable aspects of some prior art blue glasses, through the use of a particular combination of colorants in the glass, i.e., iron oxide, cobalt oxide and manganese oxide. For example, the present blue glass provides this excellent UV absorption without the use of costly UV absorbers like cerium oxide. In U.S. patent application Ser. No. 08/762,474 filed Dec. 9, 1996 and CIP application Ser. No. 08/767,768 filed Dec. 17, 1996, both commonly assigned herewith, the present inventors disclosed a high transmittance green glass with improved UV absorption, whose colorants are iron oxide and manganese oxide, and optionally any of titanium oxide, cerium oxide, vanadium oxide, and chromium oxide.

SUMMARY OF THE INVENTION

The present invention is a blue soda-lime-silica glass composition having at a 4.0 mm. thickness: 477–494 dominant wavelength and 6–40% purity of excitation. The blue glass composition has a base glass composition comprising: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: 0.4 to 2.0% total iron oxide as $Fe_2O_3$, 0.15 to 2.00% manganese oxide as $MnO_2$; 0.005 to 0.025% cobalt oxide as Co, and 0 to 1.00% titanium oxide as $TiO_2$. The weight percents of the components are based on the total weight of the glass composition.

Advantageously, embodiments of the glass composition have improved UV and IR absorption and a low shading coefficient as compared to some other blue glasses of similar color and visible transmittance. The shading coefficient is a widely used indicator of solar heat gain through a glass when compared to a standard reference glazing system. It is a significant advantage to improve UV and IR absorption, in a commercially desirable way without the use of expensive absorbers like cerium oxide as done herein, while maintaining good visible transmittance. We have found that the manganese oxide colorant of the present blue glass composition allows particularly for the avoidance of often added colorants like selenium or nickel oxide, while obtaining a pleasing medium to dark blue color.

According to another aspect of the invention, it is a commercially desirable nitrate-free method for manufacturing a blue glass composition and improving the ultraviolet absorbing properties of the glass while maintaining good visible light transmittance through the inclusion of iron oxide, cobalt oxide, and manganese oxide colorants in the glass composition. The method particularly comprises adding colorants, during molten glass formation, consisting essentially of a manganese compound along with a cobalt compound, iron oxide and optionally titanium oxide to a soda-lime-silica base glass composition, and adding no sodium nitrate into the batch during molten glass formation, to manufacture a glass having high visible light transmittance and improved ultra-violet absorption in quantities sufficient to form the blue glass composition disclosed above. Thus in this preferred method of manufacturing the glass, no sodium nitrate is added during glass melt processing. The use of sodium nitrate can lead to undesirable nitrogen oxide emissions. Anthracite coal, a reducing agent, is optionally but desirably added to the batch materials to aid in refining during the manufacturing process, in particular to cooperate with a conventional fining agent, sodium sulfate. This cooperation advantageously lowers the temperature at which $SO_3$ is released from the sulfate. The anthracite coal may be replaced in part or in total by other reductants like blast furnace slag, slag from coal fired furnaces, coke, or graphite in the batch. In the present invention, the use of such reducing agents can act to override some of the oxidizing effect of the manganese oxide colorant or sodium sulfate fining agent without destroying the blue color of the glass. These and other advantages of the present invention will become apparent from the detailed description which follows.

DETAILED DESCRIPTION OF THE INVENTION

Soda-lime-silica glass, used in the automotive and architectural industries and conveniently made by the float glass process, is generally characterized by the following basic composition shown in Table I, the amounts of the components being based on a weight percentage of the total glass composition:

TABLE I

| Base Glass Components | Weight % |
| --- | --- |
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |

The blue glass composition of the present invention employs this basic soda-lime-silica glass composition wherein, additionally, CaO+MgO is 6 to 15% and $Na_2O$+$K_2O$ is 10 to 20%. In addition, the coloring components of the blue glass composition consist essentially of: 0.4 to 2.0 wt. % total iron oxide as $Fe_2O_3$, 0.15 to 2.00 wt. % manganese oxide as $MnO_2$; 0.005 to 0.025 wt. % cobalt oxide as Co, and 0 to 1.00 wt. % titanium oxide as $TiO_2$. Further, the invention blue glass considered at a 4.0 mm. thickness has the following spectral properties: 477 to 494 dominant wavelength and 6 to 40% purity of excitation.

Blue Glass products made according to embodiments of the invention preferably have the following spectral properties at 4.0 mm. thickness: 20 to 70% light transmittance using Illuminant A (LTA) and less than 62% ultra violet (UV) transmittance measured over the range of 300 to 400 nanometers and less than 54% infra red (IR) transmittance measured over the range of 760 to 2120 nanometers. A preferred embodiment of glasses of the invention include a LTA of less than 60% with the UV transmittance being less than 50% and the IR transmittance being less than 45%. The most preferred embodiment of glasses of the invention include a LTA of less than 50% with the UV transmittance less than 40% and the IR transmittance less than 30%.

Generally, as quantities of the colorants increase in the glass composition, the % LTA, % IR and % UV transmittance of the glass will go down. Similarly, as the glass thickness increases for a given glass composition, the transmittance of the thicker glass decreases. Preferably, the dominant wavelength is between 480 and 488 nanometers with an excitation purity of 10 to 30%. Most preferably, the dominant wavelength is between 482 and 485 nanometers with an excitation purity of 10 to 20%.

Melting and refining aids are routinely included in glass manufacture and may also be used herein. One refining aid generally used to remove bubbles from the glass is sodium sulfate which generates $SO_3$ in the glass. Preferably $SO_3$ is present in the glass composition in a range of 0.10 to 0.30 wt. %, more preferably this range is 0.14 to 0.25 wt. %.

One required colorant of the invention blue glass is iron oxide, wherein as total iron oxide (as $Fe_2O_3$) it is present in quantities of 0.4 to 2.0 weight %, more preferably being 0.6 to 1.2 weight percent. All weight percents herein being based on the total weight of the invention blue glass composition. Typically, this colorant is added into the batch ingredients in the oxide form, $Fe_2O_3$. As discussed above, iron oxide exists in two forms in the glass melt. The oxidized form of iron oxide absorbs ultra violet (UV) light and the reduced form of iron oxide absorbs infra red (IR) light, hence the presence of iron oxide lowers the UV and IR transmittance through the glass products. Both absorbing functions of the iron oxide are especially valuable when the glass product is used in architectural applications particularly in geographic areas having a significant amount of sunshine.

Another essential colorant in the invention blue glass composition is manganese oxide which is present in the composition in an amount of 0.15 to 2.0 wt. % as $MnO_2$, more preferably in an amount of 0.2 to 0.8 wt % $MnO_2$. The manganese component can be added to the batch glass materials in a variety of manganese compound forms, including, but not limited to, MnO, $MnO_2$, $Mn_3O_4$, $MnSO_4$, $MnCO_3$, $MnCl_2$, $MnF_2$, etc, as well as mixtures of any of them. This colorant is generally present as a $Mn^{+2}$ and $Mn^{+3}$ oxide of manganese in the glass, although it may additionally or alternately be present in other states such as $Mn^{+4}$. It is generally expected that any manganese compound used would be present in the glass as manganese oxide.

It is important that the $Mn_2O_3$ form of manganese oxide generally absorbs in the same spectral area as selenium or nickel oxide colorants. Thus we have found it may be used in the blue invention composition to provide, in part, the coloring effect of selenium or nickel oxide in obtaining the desired blue color of the present invention glass, yet without the drawbacks of either selenium or nickel. As disclosed above, selenium is expensive and easily volatilized from the glass melt. Manganese oxide, for example, is inexpensive and not subject to such volatility as is selenium so that it is optimal as a colorant in the present blue glass composition. Using nickel oxide as a colorant brings about the undesirable potential to form nickel sulfide stones in the glass when sulfates are used as fining agents. Nickel sulfide stones are small ellipsoids that escape normal inspection methods during glass manufacturing and have been known to cause spontaneous breakage upon tempering of the glass. It has often been suggested in the literature that the use of manganese oxide along with iron oxide should be avoided in glass compositions because of the tendency of the glass to then solarize. That is, manganese oxide has been known to cause glass to discolor when it is exposed to a strong ultraviolet light. U.S. Pat. No. 5,344,798 mentioned above discusses the solarization problem as related to the inclusion of manganese oxide in the glass and limits its inclusion. In the present invention, the composition includes relatively large amounts of manganese oxide and yet we have found, as shown in the examples, that this amount of manganese oxide is not expected to cause the glass to solarize.

The manganese colorant has oxidizing ability which we have found additionally useful in the present invention. We wish to oxidize the iron oxide towards its more colorless form. Oxidizing environments have been provided to glass melts in several ways, for example by providing additional air to the glass melt in the furnace, increasing sodium sulfate, calcium sulfate, or sodium nitrate in the batch or lowering the temperature of the furnace. All of these efforts have commercial drawbacks. For example, use of sodium nitrate can lead to undesirable nitrogen oxide emissions. We have found that the use of the manganese oxide colorant in the glass in a range of 0.15 to 2.00 wt. % as $MnO_2$ additionally provides oxidizing benefits in the manufacture of the present invention blue glass eliminating the need of any additional oxidizer, like sodium nitrate. Thus, desirably, this blue glass composition may be manufactured without the use of sodium nitrate, as is preferred herein.

When the manganese compound is added to the glass batch, it is reduced to its more colorless form. For example, a portion of the purple colored manganese oxide colorant in its oxidized form (e.g., $Mn_2O_3$) is converted to the more colorless, reduced MnO. We have thus found that more iron oxide may be added to the batch to enhance both the ultraviolet and the infra red absorption of the glass while simultaneously maintaining a high visible transmittance and obtaining a desired blue color of the glass. While it is expected that the other manganese compounds like $MnCl_2$ would be similarly useful and converted to oxides in the batch, preferably it is most desirable to use the manganese oxide or manganese carbonate compounds as sources of the manganese oxide colorant in the glass batch.

Cobalt is another colorant required in the present invention blue glass composition. It is typically added to the batch ingredients as an oxide compound thereof, and is present as a coloring component in the glass in an amount of 0.005 to 0.025 wt. % as Co, preferably in an amount of 0.005 to 0.015 wt. % and most preferably in an amount of 0.006 to 0.012 wt. % as Co. The cobalt colorant functions to absorb light in the 580 to 680 nanometer range of the visible spectrum. The strong absorption in the 580 to 680 nanometer range and weaker absorption in the lower wavelengths is what primarily gives glass of the present invention its blue color. It is necessary to balance the amount of absorption from $MnO_2$ and both FeO and $Fe_2O_3$ with that of cobalt to achieve the desired blue appearance of the present glass composition.

Ordinarily, in conventional glass compositions, increasing the amount of iron oxide would undesirably reduce the amount of visible light being transmitted through the glass. Thus while the UV and IR properties might be improved in conventional glass by increasing the iron oxide colorant, if a high visible light transmittance glass were desired, it would not be achieved. The present invention advantageously provides a blue glass with good UV and IR absorption, while at the same time maintaining good visible transmittance and a pleasing medium blue color. And it provides the good UV absorption without the use of costly UV absorbers like cerium oxide.

One property of the manganese colorant, its oxidizing ability toward the iron oxide, acts to improve the UV absorption of the invention blue glass. And, in the present invention, increasing the total iron concentration can improve the IR absorption plus again lower the UV absorption. In another preferred embodiment of the present invention discussed in more detail below, anthracite coal or other reductant is used together in the batch with the colorants to further increase the UV and IR absorption of the glass product. The anthracite coal shifts some of the manganese oxide and iron oxide toward their reduced forms and the effect is to enhance the blue color. The visible transmittance (% LTA) is lowered when manganese oxide, cobalt oxide, iron oxide and anthracite coal are used in the manner described above. Some of the cobalt oxide can be removed to raise the % LTA and the glass will remain blue from the coloring effect of the reduced species of both iron oxide and manganese oxide.

The particular amounts of each of the colorant employed, e.g., iron oxide and each form of iron oxide ($Fe^{+3}$, $Fe^{+2}$) in a embodiment of a glass product according to the present invention will be a matter of choice and dependent in part on the desired spectral properties of the blue glass product, as would be apparent to those skilled in the art in view of the present disclosure. Selection of a particular embodiment glass composition will be dependent in large part on its desired application, such that one application glass product advantageously has more UV absorption while another glass product optimally has better IR absorption.

As explained above, the present glass invention has been found to have improved UV absorption while maintaining good visible transmittance without the use of costly additives. For example, a sample of a commercially available blue glass made according to U.S. Pat. No. RE 34,639, discussed above and being commonly assigned herewith, includes iron oxide, cobalt, and selenium as colorants and has a UV transmittance of about 64.7% and an IR transmittance of 48.8% at 64.7% LTA (composition of Example 1 herein). A present invention embodiment of similar color appearance can be made having, at 63.6% LTA, a UV transmittance of 40.0% and an IR transmittance of 40.6% as in Example 3. Example 2 has a UV transmittance of 45.5% and an IR transmittance of 41.0% at 64.7% LTA. These examples demonstrate the significant improvement of the UV and IR properties of embodiments of the present blue composition as compared to available blue glass with almost the same % LTA. The advantage for architectural applications is apparent.

The present invention glass composition may also include titanium oxide as $TiO_2$ in an amount up to 1.0 wt. % to improve the UV absorption of the glass. Generally, the present invention glass does not require any added titanium oxide since it possesses excellent UV and IR properties. Should it be desired to enhance the UV absorption, titanium dioxide may be added and preferably when included it will comprise up to about 0.4 wt. % of the blue glass composition.

It is known that tramp materials may enter the glass batch during production changeover from one glass composition to another in the glass melting furnaces or from impurities often accompanying the raw materials used. Exemplary of such tramp materials are selenium, nickel oxide, molybdenum, zinc, zirconium, lithium, and chromium, although this list is not meant to be limiting. Still others will be apparent to those skilled in the art in view of the present disclosure. These tramp materials or impurities are expected to be in small amounts, e.g., up to 0.0005 wt. % selenium and up to 0.005 wt. % nickel oxide as NiO. Depending on the source of the raw materials, of course, titanium dioxide often enters soda-lime-silica glass compositions as an impurity with the sand, dolomite or limestone in levels that give rise in the final glass product, even when no titanium dioxide has intentionally been added, in a range of about 0.015 wt. % or 0.02 wt. % to about 0.05 wt. % titanium dioxide.

The following table lists ingredients which are preferably used to form the optimal embodiments of blue glass compositions according to the present invention.

TABLE II

| BATCH MATERIALS | RANGE MASS (LBS.) |
|---|---|
| SAND | 1000 |
| SODA ASH | 290 TO 350 |
| DOLOMITE | 215 TO 260 |
| LIMESTONE | 70 TO 90 |
| SALT CAKE | 6 TO 24 |
| ROUGE (97% $Fe_2O_3$) | 6 TO 30 |
| MANGANESE DIOXIDE | 2.0 TO 28 |
| COBALT OXIDE ($Co_3O_4$) | 0.095 TO 0.5 |
| TITANIUM DIOXIDE | 0 TO 14 |
| CARBOCITE | 0 TO 4 |
| NEPHELINE SYENITE | 0 TO 150 |

In order to demonstrate the advantages of the present invention blue glass, glass melts detailed in all of the examples were made in the laboratory according to the following procedure: batches were weighed, placed into a glass jar about 2" high and 2" inside diameter and dry mixed for 10 minutes each on a Turbula mixer, dry batch was placed into an 80% platinum/20% rhodium crucible that stands 2" tall and has an inside diameter at the top of 2.5" and is tapered to the base which has an inside diameter of 1.75". An amount of 4.5 ml. of water is added to the dry batch in the crucible and mixed with a metal spoon. After such preparation, a group of six different batches is melted in a gas/air fired furnace at the same time for 1 hour at 2600° F. and each crucible is removed in turn from the furnace and fritted. Fritting the glass involves coating the inside of the platinum/rhodium crucible with the molten glass and then plunging the crucible into cold water.

After removing the crucible from the water and draining the water, the broken glass particles are removed from the sides of the crucible and mechanically mixed inside the crucible. All six samples are fritted in like manner and all crucibles are placed back into the furnace for another 1 hour interval at 2600° F. and the fritting procedure is repeated. After the second fritting process, the crucibles are returned to the furnace for 4 hours at 2600° F. Each crucible is removed in turn from the furnace and each molten glass sample is poured into a graphite mold with an inside diameter of 2.5". Each glass is cooled slowly, labeled, and placed into an annealing furnace where the temperature is quickly raised to 1050° F., held for 2 hours, and then slowly cooled by shutting off the furnace and removing the samples after 14 or more hours. The samples are ground and polished to about 4.0 mm. thickness and subsequently the spectral properties are measured for each sample.

All the laboratory melts of the examples are made with the above procedure and use a base composition of 100 grams sand, 32.22 grams of soda ash, 8.81 grams of limestone, 23.09 grams of dolomite, 1.2 grams of sodium sulfate, 2.64 grams of nepheline syenite, and the remainder of the batch includes rouge, manganese dioxide and cobalt oxide and may include anthracite coal or other reductant as described in the example melts. Titanium dioxide also may be added to improve ultra violet absorption, if desired. The base composition of a typical glass melt made from the batch materials above would be about 72 wt. % $SiO_2$, 13.5 wt. % $Na_2O$, 0.15 wt. % $K_2O$, 8.4 wt. % CaO, 3.6 wt. % MgO, 0.6 wt. % $Al_2O_3$, and 0.2 wt. % $SO_3$. The range of colorants of the invention embodiment examples herein was: 0.4 to 2.0 wt. % $Fe_2O_3$, 0.15% to 2.00 wt. % $MnO_2$, 0.005 to 0.025 wt. % CoO, and 0 to 1.0 wt. % $TiO_2$, the specific amounts being detailed in the examples. As would be appreciated by those skilled in the art, the wt. % concentration of the base components would decrease as the total amount of colorants is increased.

Table III shows the improvement of the ultra violet and infra red absorption of several examples of embodiments of present invention glass compositions (i.e., other than Example 1 which is a comparative example) including varying amounts of manganese dioxide colorant. In particular, Table III below shows the improvements in ultra violet absorption with an increasing amount of $MnO_2$ at a constant level of 0.6 wt. % $Fe_2O_3$ For comparison, Example 1 is a commercially made product based on U.S. Pat. No. RE. 34,639 commonly owned herewith as discussed above, which contains about 0.0002 wt. % selenium. In both Tables III and IV, no $TiO_2$ was added to the glass, but it was present as an impurity in the glass at a level of about 0.02 wt. %, having come in with raw materials.

TABLE III

| | Ex. 1 | Ex. 2 | Ex. 3 | Ex. 4 | Ex. 5 | Ex. 6 | Ex. 7 |
|---|---|---|---|---|---|---|---|
| Wt % $Fe_2O_3$ | 0.42 | 0.6 | 0.6 | 0.6 | 0.6 | 0.6 | 0.6 |
| Wt % FeO | 0.096 | 0.123 | 0.125 | 0.109 | 0.123 | 0.254 | 0.266 |
| ppm Co | 50 | 50 | 50 | 150 | 150 | 150 | 150 |
| Wt % $MnO_2$ | None | 0.2 | 0.6 | 0.2 | 0.6 | 0.2 | 0.6 |
| % LTA | 64.7 | 64.7 | 63.6 | 49.3 | 42.9 | 40.3 | 39.3 |
| % UV | 64.7 | 45.5 | 40.0 | 42.9 | 39.3 | 50.9 | 46.9 |
| % IR | 48.8 | 41.0 | 40.6 | 44.1 | 40.5 | 18.2 | 16.9 |
| % TSET | 58.7 | 53.6 | 52.3 | 49.8 | 45.4 | 33.1 | 31.6 |
| Dom. Wavelength | 481.9 | 484.3 | 486.3 | 479.6 | 479.4 | 478.9 | 479.4 |
| % Excitation Purity | 8.7 | 9.4 | 8.2 | 20.2 | 23.7 | 29.8 | 29.5 |

From Table III, it can be readily seen that the addition of manganese dioxide colorant together with the relatively increased amount of iron oxide colorant significantly improves both the ultra violet and infra red absorption of the present invention blue glass composition. Particularly, compare the spectral properties of commercial product of Example 1 to glass of the present invention embodiments in Examples 2 and 3. Most desirably, in addition to the significant improvement in the ultra violet absorption of the glass, the invention examples also maintain the visible transmittance of the glass, as evidenced by a similar % LTA. Examples 4 and 5 shows the increase in blue color intensity by increasing the concentration of cobalt oxide with correspondingly significant improvements in both UV and IR absorption. Examples 6 and 7 are similar to Examples 5 and 6 respectively, except that anthracite coal was added to the batch such that the salt cake to anthracite coal ratio was 7:1 to generate reducing conditions. The reducing conditions significantly improved the IR absorption while also attaining better UV absorption than the commercial blue glass product of Example 1.

While Table III showed the improvement in ultra violet absorption of present invention glasses with constant total iron colorant when the MnO2 colorant was increased, Table IV shows the change in ultra violet absorption when a constant amount of $MnO_2$ (0.2 wt. %) is added to various concentrations of $Fe_2O_3$.

The results of Table IV, for present invention glass composition embodiments, demonstrate that, in glasses with a constant $MnO_2$ wt. % (concentration), increasing the $Fe_2O_3$, correspondingly increases the ultra violet absorption. Table IV also shows that at a given concentration of $MnO_2$ colorant, the dominant wavelength (color) tends to increase slightly as the total iron oxide is increased in the glass. Example 3 (Table III) is the same as Example 9 in Table IV. Example 8 demonstrates the improved UV absorption compared to Example 1 in Table III based, it is believed, on the action of the manganese colorant to shift the iron oxide colorant toward its oxidized form. The blue color and intensity of present invention embodiment blue glass in Example 8 is similar to the commercial blue glass of Example 1 and yet has the added benefit of a higher % LTA. Table IV also demonstrates that the infra red transmittance is lowered in the present invention embodiments as the total iron oxide is increased in the blue invention glass compositions.

TABLE IV

|  | Ex. 8 | Ex. 9 | Ex. 10 | Ex. 11 | Ex. 12 | Ex. 13 |
|---|---|---|---|---|---|---|
| Wt. % $Fe_2O_3$ | 0.4 | 0.6 | 0.75 | 0.9 | 1.2 | 1.6 |
| Wt % FeO | 0.091 | 0.125 | 0.228 | 0.318 | 0.450 | 0.644 |
| ppm Co | 50 | 50 | 50 | 50 | 50 | 50 |
| Wt % $MnO_2$ | 0.2 | 0.2 | 0.2 | 0.2 | 0.2 | 0.2 |
| % LTA | 68.0 | 64.7 | 58.9 | 54.0 | 46.6 | 35.1 |
| % UV | 56.1 | 45.5 | 41.4 | 36.9 | 27.7 | 17.5 |
| % IR | 50.4 | 41.0 | 21.5 | 12.7 | 6.1 | 1.6 |
| % TSET | 60.5 | 53.6 | 40.3 | 33.0 | 25.4 | 16.9 |
| Dom. Wavelength | 482.7 | 484.3 | 485.2 | 485.8 | 487.0 | 488.5 |
| % Excitation Purity | 9.4 | 9.4 | 12.4 | 14.4 | 16.2 | 19.5 |

Table V demonstrates the spectral property changes that occur when sodium sulfate and anthracite coal are varied within the embodiment of the invention. The total iron oxide, ppm Co and wt. % MnO2 were maintained at constant values and the % FeO is the only variable. The actual % $Fe_2O_3$ varies proportionately with the respective concentration of % FeO to maintain the total iron oxide at 0.6 wt. %. Note that the anthracite coal has a stronger impact on the concentration of % FeO than does the concentration of sodium sulfate. Examples 14 through 17 have the same wt ratio of sodium sulfate to anthracite coal (7:1), but the reducing action of the coal overwhelms the oxidizing effect of increasing the sodium sulfate. Note also in Example 16, 18, and 19 at constant sodium sulfate concentration that as the anthracite coal is lowered, then the % FeO gradually falls. In Examples 14 through 19, the constant cobalt oxide and manganese dioxide keep the dominant wavelength and excitation purity within a small range.

TABLE V

|  | Ex. 14 | Ex. 15 | Ex. 16 | Ex. 17 | Ex. 18 | Ex. 19 |
|---|---|---|---|---|---|---|
| Wt. % $Fe_2O_3$ | 0.6 | 0.6 | 0.6 | 0.6 | 0.6 | 0.6 |
| Wt % FeO | 0.274 | 0.303 | 0.331 | 0.353 | 0.282 | 0.274 |

TABLE V-continued

|  | Ex. 14 | Ex. 15 | Ex. 16 | Ex. 17 | Ex. 18 | Ex. 19 |
|---|---|---|---|---|---|---|
| ppm Co | 80 | 80 | 80 | 80 | 80 | 80 |
| Wt % $MnO_2$ | 0.4 | 0.4 | 0.4 | 0.4 | 0.4 | 0.4 |
| $Na_2SO_4$ / 1000 $SiO_2$ | 7.5 | 10 | 12 | 16 | 12 | 12 |
| Coal/ 1000 $SiO_2$ | 1.07 | 1.43 | 1.71 | 2.29 | 0.8 | 0.48 |
| % LTA | 51.6 | 52.3 | 50.4 | 48.1 | 51.6 | 52.3 |
| % UV | 48.5 | 50.4 | 51.0 | 47.7 | 46.2 | 50.3 |
| % IR | 16.4 | 13.9 | 11.7 | 10.5 | 15.6 | 16.3 |
| % TSET | 35.4 | 34.1 | 32.1 | 30.0 | 34.5 | 35.7 |
| Dom. Wavelength | 482.6 | 483.1 | 483.1 | 484.0 | 483.7 | 482.5 |
| % Excitation Purity | 19.3 | 18.7 | 19.9 | 19.1 | 17.3 | 19.4 |

Table VI below further demonstrates the impact of using anthracite coal as compared to not using coal in the batch. Manganese dioxide colorant, sodium sulfate and total iron oxide colorant were kept constant while the % FeO varied due to the reducing power of the coal. Examples 20 through 22 did not have any reducing agent in the batch while Examples 23 through 25 each had anthracite coal in the batch which reduced the iron oxide to generate a higher % FeO and the % IR transmitted was much lower. Note that in each case as the cobalt oxide increased, the dominant wavelength dropped and the % excitation purity increased indicating that the blue color was more intense.

TABLE VI

|  | Ex. 20 | Ex. 21 | Ex. 22 | Ex. 23 | Ex. 24 | Ex. 25 |
|---|---|---|---|---|---|---|
| Wt. % $Fe_2O_3$ | 0.6 | 0.6 | 0.6 | 0.6 | 0.6 | 0.6 |
| Wt % FeO | 0.121 | 0.115 | 0.117 | 0.150 | 0.148 | 0.152 |
| ppm Co | 65 | 80 | 95 | 65 | 80 | 95 |
| Wt % $MnO_2$ | 0.2 | 0.2 | 0.2 | 0.2 | 0.2 | 0.2 |
| $Na_2SO_4$/ 1000 $SiO_2$ | 12 | 12 | 12 | 12 | 12 | 12 |
| Coal/ 1000 $SiO_2$ | 0 | 0 | 0 | 0.8 | 0.8 | 0.8 |
| % LTA | 57.9 | 57.6 | 54.2 | 59.7 | 56.3 | 52.6 |
| % UV | 41.3 | 44.9 | 44.8 | 46.2 | 46.5 | 45.9 |
| % IR | 41.2 | 43.1 | 42.4 | 34.6 | 34.9 | 34.0 |
| % TSET | 51.1 | 52.3 | 50.8 | 48.4 | 47.5 | 45.7 |
| Dom. Wavelength | 482.8 | 481.8 | 480.9 | 482.9 | 481.9 | 481.0 |
| % Excitation Purity | 12.9 | 14.0 | 16.3 | 12.9 | 15.3 | 18.1 |

Table VII below demonstrates the increase in the dominant wavelength as the manganese oxide colorant is increased from 0.2 to 0.6 wt. % plus the oxidizing effect that lowers the % UV transmitted at the higher manganese oxide concentration and at constant iron oxide levels. It further demonstrates the influence of increased iron oxide colorant. In particular, as the iron oxide concentration increases; the % UV, % IR, and the % LTA are all lowered. All of the Examples in Table VII demonstrate the increased absorption in the IR from the addition of anthracite coal.

TABLE VII

|  | Ex. 26 | Ex. 27 | Ex. 28 | Ex. 29 | Ex. 30 | Ex. 31 |
|---|---|---|---|---|---|---|
| Wt. % $Fe_2O_2$ | 0.4 | 0.4 | 0.9 | 0.9 | 1.6 | 1.6 |
| Wt % FeO | 0.163 | 0.160 | 0.373 | 0.367 | 0.622 | 0.644 |
| ppm Co | 150 | 150 | 150 | 150 | 150 | 150 |
| Wt % $MnO_2$ | 0.2 | 0.6 | 0.2 | 0.6 | 0.2 | 0.6 |
| $Na_2SO_4$/1000 $SiO_2$ | 12 | 12 | 12 | 12 | 12 | 12 |
| Coal/1000 $SiO_2$ | 1.71 | 1.71 | 1.71 | 1.71 | 1.71 | 1.71 |
| % LTA | 43.8 | 43.2 | 36.4 | 36.1 | 24.6 | 23.3 |
| % UV | 61.6 | 55.2 | 37.8 | 35.6 | 16.4 | 12.7 |
| % IR | 31.5 | 32.1 | 9.1 | 9.4 | 2.0 | 1.9 |
| % TSET | 42.5 | 42.1 | 25.2 | 25.0 | 13.9 | 12.9 |
| Dom. Wavelength | 477.9 | 478.4 | 480.4 | 480.9 | 482.8 | 483.9 |
| % Excitation Purity | 28.5 | 27.3 | 30.1 | 29.4 | 31.7 | 30.1 |

Blue glass compositions made according to the present invention can be used for both automotive and architectural applications. Generally, they would be manufactured by well known float glass techniques. Present federal automotive regulations require a minimum of 70.0% LTA measured at the actual glass thickness, in general, for glazings used in automotive vehicles. For example, sun-roofs may have a lower LTA. The blue glass of the present invention is expected to maintain its LTA throughout its useful life. Glasses containing manganese and iron oxide colorants have been known to solarize or discolor when exposed to a strong ultra violet light source as discussed above. Tests of glass compositions in the ranges of the concentrations of the iron oxide with manganese oxide colorants of the present blue glass compositions by the inventors have demonstrated that solarization does not take place. It is expected that the present invention blue glass additionally including cobalt oxide will likewise not experience solarization since it is the manganese oxide which has been repeatedly implicated in literature as causing solarization, not colbalt oxide.

The examples demonstrate the inventors unexpected discovery of an advantageous way to improve ultra violet light absorption in blue glass products while maintaining good visible transmission and, at the same time, improving absorption in the infra red portion of the spectrum. All of this has remarkably been accomplished in a low cost and environmentally friendly way, i.e. by using, as one of the colorants, a manganese compounds instead of commonly used materials like selenium, nickel, or cerium oxide in the glass composition batch. And preferably, the blue glass can avoid the inclusion of sodium nitrates into the glass batch as is generally used in glass manufacture, since these nitrates are a source of undesirable NOx emissions.

While embodiments of the novel blue glass composition of the invention has been illustrated and described, it will be obvious to those skilled in the art in the light of the present disclosure that various modifications within the scope of the disclosure may be made without departing from the invention. It is intended to cover in the appended claims all such modifications and equivalents as fall within the true spirit and scope of the invention.

We claim:

1. A blue colored ultra violet and infra red absorbing glass composition, having a base glass composition comprising: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: 0.4 to 2.0% total iron oxide as $Fe_2O_3$; 0.15 to 2.00% manganese oxide as $MnO_2$; 0.005 to 0.025% cobalt oxide as Co, and 0 to 1.00% titanium oxide as $TiO_2$, all percentages being based on the weight percent of the total blue glass composition; the blue glass having at a 4.0 mm. thickness: 477–494 dominant wavelength and 6–40% purity of excitation.

2. The blue glass composition according to claim 1 wherein the dominant wavelength is between 480 and 488 nanometers.

3. The blue colored glass composition according to claim 1 wherein the amount of said total iron expressed as $Fe_2O$, is within the range of 0.6 to 1.2 wt. %.

4. The blue glass composition according to claim 1 wherein the amount of manganese compound expressed as $MnO_2$ is 0.2 to 0.8 wt. %.

5. The blue glass composition according to claim 1 wherein the wherein the purity of excitation of the blue glass is from 10 to 30%.

6. The blue glass composition according to claim 1 wherein the amount of cobalt oxide as Co in said blue glass composition is within the range of 0.005 to 0.015 wt. %.

7. The blue glass composition according to claim 1 wherein the dominant wavelength of said blue glass composition is between 482 and 485 nanometers.

8. The blue glass composition according to claim 1 wherein said purity of excitation of said blue glass composition is between 10 and 20%.

9. The blue glass composition according to claim 1 wherein said composition contains about 0.10 to 0.30 $SO_3$.

10. The blue glass composition according to claim 1 wherein said glass at 4.0 mm thickness has the spectral properties: 20 to 70% light transmittance using Illuminant A (LTA) and less than 62% ultra violet (UV) transmittance measured over the range of 300 to 400 nanometers and less than 54% infra red (IR) transmittance over the range of 760 to 2120 nanometers.

11. A blue ultra violet and infra red absorbing glass composition comprising: 68 to 75% $SiO_2$, 10 to 18% $Na_2O$, 5 to 15% CaO, 0 to 10% MgO, 0 to 5% $Al_2O_3$, and 0 to 5% $K_2O$, where CaO+MgO is 6 to 15% and $Na_2O+K_2O$ is 10 to 20%; and colorants consisting essentially of: about 0.6 to 1.2% total iron oxide as $Fe_2O_3$; about 0.2 to 0.8% manganese oxide as $MnO_2$; about 0.005 to 0.015% cobalt oxide as Co, about 0 to 1.00% titanium oxide as $TiO_2$, all weight percents being based on the total weight of the blue glass composition; the blue glass having at a 4.0 mm. thickness: 480–488 dominant wavelength and 10–30% purity of excitation.

12. The blue glass composition according to claim 1 being manufactured with the addition of anthracite coal or other reductant as a raw material component.

13. The blue glass composition according to claim 1 wherein said blue glass is manufactured without the use of sodium nitrate.

14. An automotive or architectural glass made from the composition of claim 1 wherein the glass was floated on a molten tin bath.

15. An automotive or architectural glazing made from the composition of claim 1.

* * * * *